Oct. 10, 1967 D. C. FERGUSON ET AL 3,346,846

SIGNAL LEVEL DETECTION CIRCUIT HAVING AUTOMATICALLY CHANGED IMPEDANCE

Filed Dec. 18, 1963

INVENTORS
DONALD C. FERGUSON
MORRIS V. FLOWERS JR.

BY Arthur H. Sessell

ATTORNEY 3,346,846

SIGNAL LEVEL DETECTION CIRCUIT HAVING AUTOMATICALLY CHANGED IMPEDANCE

Donald C. Ferguson, Scottsdale, and Morris V. Flowers, Phoenix, Ariz., assignors to Sperry Rand Corporation, Great Neck, N.Y., a corporation of Delaware Filed Dec. 18, 1963, Ser. No. 331,554
8 Claims. (Cl. 340—172)

ABSTRACT OF THE DISCLOSURE

A detection device is gated "on" between upper and lower threshold values of an input voltage by means of an SCR which is initially triggered at the lower threshold voltage, is restored to cut-off and is then re-triggered at the higher threshold level, the detection device being shorted to ground upon the second triggering of the SCR.

This invention relates to an electrical system that initially detects a pulsating voltage input at a first amplitude level and subsequently detects a like input at a second amplitude threshold level that is higher than the first level. More particularly, the improved system includes a circuit with a detecting device, and a circuit operative at the repective threshold levels for gating the detecting circuit that is initially triggered at the first or lower voltage threshold level and is subsequently triggered at the second or higher voltage threshold level. In the voltage range or band of operation of the system, the detecting device senses minimum and maximum voltage values to provide aural, visual or fail safe monitoring where required such as in automatic pilots.

The improved system includes interconnected input, on-off gating, energizing, detecing and bypassing circuits, and sequentially conditionable means for respectively triggering the gating circuit at the first threshold level initially and at the second threshold level subsequently. The input circuit of the system includes an amplitude sensitive rectifier such as a zener diode that blocks inputs of amplitude below the first threshold level and passes inputs above the level. The conditionable means of the system changes the level at which the gating circuit is triggered from the lower to the higher threshold level and connects the detecting and energizing circuits at the lower threshold level. The bypassing circuit of the system bypasses the detecting device in the detecting circuit when the gating circuit is triggered at the second or higher threshold level. The gating circuit of the system includes a gating device that conducts or fires sequentially at the respective lower and upper threshold levels. Accordingly, there is no variation in the input voltage threshold upper and lower levels with changes in local temperature conditions.

Figure 1:
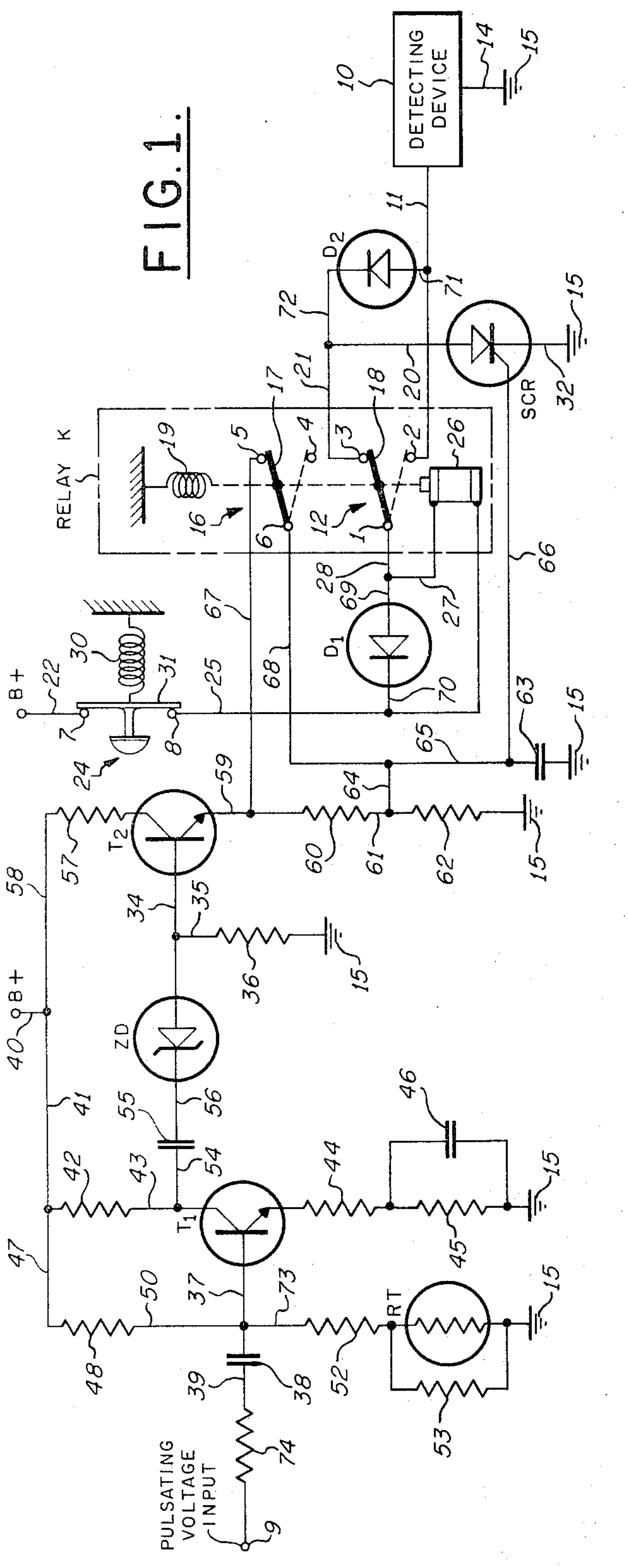
Figure 2:
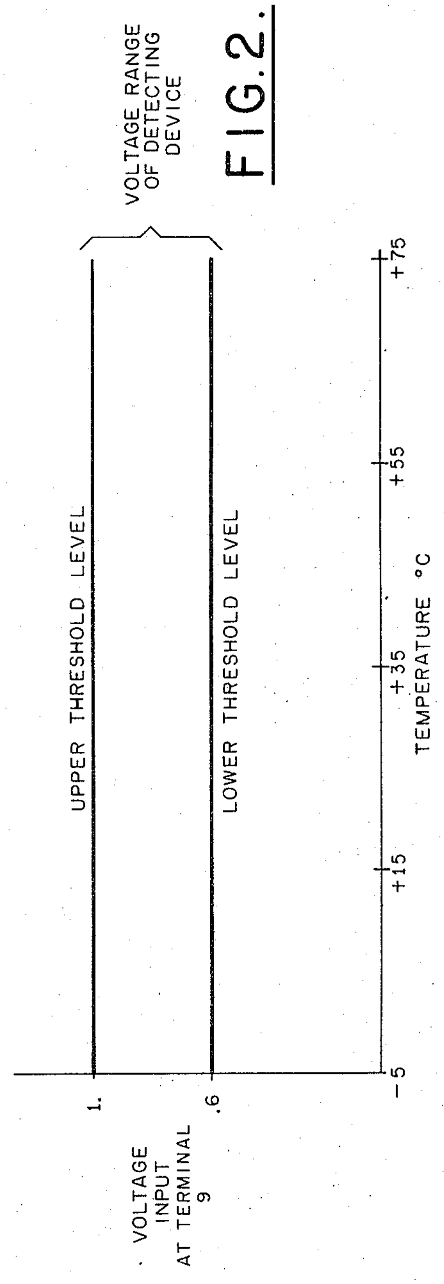

Other novel features and structural details of the present invention will be apparent from the following description when read in relation to the accompanying drawings in which:

FIG. 1 is an electrical schematic and circuit diagram showing the interrelated components of the improved system, and FIG. 2 is a graph of voltage curves showing the fixed relation between illustrative upper and lower threshold level with respect to a temperature range of between −5 and +75 degrees centigrade.

As shown, the controlled component of the improved system is provided by a detecting device indicated at 10. The device 10 is a circuit component that responds to the operation of the system at the respective first or lower threshold level indicated as .6 volt in FIG. 2 as well as the second or higher threshold level indicated as 1.0 volt in FIG. 2. Where a visual indication of the detectable condition is required, the device 10 may be a suitable electric light bulb that is illuminated when the first threshold voltage level is reached and is extinguished when the second threshold voltage is reached. Accordingly, device 10 may also be a suitable buzzer or an electric relay that operates either to produce sound or close a suitable monitoring circuit at the lower voltage sensing level and to maintain this condition within the voltage range of operation of the system. As shown, the device 10 is series connected in a detecting circuit that includes a lead 11 between device 10 and the terminal 2 in a three terminal switch 12 of a relay K. Lead 14 connects the device 10 to a suitable ground 15.

Relay K also includes a make-break switch 16 having terminals 4 and 5, a common terminal 6, and a blade 17. The switch 12 of relay K also includes a terminal 3, a common terminal 1 and blade 18. As shown, the tandem connected blades 17 and 18 are biased in an initial condition by spring 19 with blade 17 engaged with terminal 5 and with blade 18 engaged with terminal 3.

The single gating device included in the improved system is provided by a silicon control rectifier SCR whose anode is connected to terminal 3 of switch 12 by way of lead 20 and connecting lead 21. The provided on-off gating circuit in its initial (on) condition is connected to a (B+) source of electrical energy by way of an energizing circuit to switch terminal 1 that includes lead 22, a make-break reset switch 24 in closed condition, lead 25 to the coil 26 of relay K, and connecting leads 27 and 28 to the switch 12. In this condition, the circuits on the respective sides of the switch 12 are connected through the switch so that the anode of the silicon control rectifier is energized, the coil 26 is ineffective to operate the relay K and the detecting circuit is open at terminal 2. Spring 30 of reset switch 24 provides the necessary bias to normally engage the switch blade 31 and the terminals 7 and 8. The cathode of the gating device SCR is connected to ground 15 by way of lead 32.

As shown in FIG. 1, the input circuit of the improved system includes an amplitude sensitive rectifier indicated as a zener diode ZD whose anode is connected to the base of a transistor $T_2$ by way of lead 34 and is connected to ground 15 by way of connecting lead 35 and resistor 36. In the illustrated circuitry, an amplifying stage with temperature compensation connects the zener diode ZD to a pulsating voltage input terminal 9. As shown, the amplifier includes a transistor $T_1$ whose base is connected to the terminal 9 by way of lead 37, coupling capacitor 38, lead 39 and resistor 74. The collector of the transistor $T_1$ is connected to a B+ source by way of leads 40, 41, a resistor 42 and lead 43. The emitter circuit for the transistor $T_1$ to ground 15 includes a series connected resistor 44 and parallel connected resistor 45 and capacitor 46. The base circuit of the transistor $T_1$ is also connected to the B+ source through lead 47, a resistor 48, lead 37 and lead 50; and through lead 37, lead 73, resistor 52 and parallel connected resistor 53 and thermistor RT to ground 15. Variance in the performance of $T_1$ and ZD with temperature in the system is corrected by the change in resistance of the thermistor RT in the compensating circuit over an operating range of between −5 and +75 degrees centigrade. The provided amplification raises the level of an input at terminal 9 of .6 volt to 1.0 volt in FIG. 2 to a voltage level corresponding to the levels necessary to fire ZD and consequently operate the SCR at the desired lower and upper levels. The coupling circuit between the ZD and transistor $T_1$ includes lead 54, a coupling capacitor 55 and lead 56 to the cathode of the rectifier ZD. The ZD of the input circuit fires only at values of the output voltage of $T_1$ that are above the lower threshold input level of .6 volt amplified by $T_1$. Pulsating inputs that are below the noted level are accordingly blocked from the system by the amplitude sensitive rectifier ZD. Voltage amplitude levels at and above the .6 volt input level at terminal 9 are passed by the ZD.

The circuit connecting the ZD to the gating connection of the SCR includes the transistor $T_2$. As shown in FIG. 1, the collector connection of transistor $T_2$ is connected to the B+ source by way of resistor 57 and lead 58 to lead 40. The emitter circuit includes lead 59, and shortable resistor 60, lead 61, a fixed resistor 62 to ground 15, and a capacitor 63 to ground 15 connected in parallel to the resistor 62 by lead 64 to lead 61 and lead 65. A lead 66 also connects the lead 65 to the gating connection of the gating device SCR. Terminal 5 of switch 16 is connected to lead 59 by way of lead 67. Lead 68 also connects the lead 64 to the common terminal 6 of the switch 16 of relay K.

The relay K and switches 12, 16 of the improved system provide a sequentially conditionable means for respectively triggering the gating circuit at the first threshold voltage level initially and at the second threshold voltage level subsequently. With the blade 17 of the make-break relay switch 16 in a make condition as shown in engagement with terminal 5, the resistor 60 in the circuit connecting the rectifier ZD and the gating device SCR is shorted by leads 67, blade 17 and lead 68 so that the system is conditioned to energize the coil 26 of the relay K when an input above the lower threshold level passes through the rectifier ZD. The gating device SCR fires initially at the lower threshold level with the circuit to the B+ source closed through the coil 26 of the relay K and the switch 12 with blade 18 engaged with terminal 3 as shown in FIG. 1. Operation of the relay K overcomes spring 19 and moves the blade 17 to the dotted line position of the switch 16 to the break terminal 4 to open the branch circuit in parallel with the resistor 60 and accordingly raise the triggering level of the gating device to the upper threshold level of 1.0 volt. This operation also moves the blade 18 to the dotted line position of switch 12 to engage the terminal 2 and connect the detecting device 10 to the B+ source of energy through the relay coil 26 which remains energized until the system is reconditioned by manual operation of the reset switch 24. At the same time, the switch 12 opens the circuit to the anode of the gating device to restore it to a cut-off condition. To give the relay K sufficient holding time for the completion of the movement of the switch blades 17, 18 from terminals 5, 3 to terminals 4, 2, a rectifier in the form of a diode $D_1$ is connected to the energizing circuit to terminal 1 of switch 12 across the coil 26. As shown, this circuit includes lead 69 to lead 28, the diode $D_1$ and lead 70 to lead 25. The inclusion of resistor 60 in the connecting circuit between transistor $T_2$ and the gating device SCR changes the triggering level of the gating circuit from a level corresponding to the lower threshold level to a level corresponding to the upper threshold level indicated in FIG. 2. The improved system accordingly includes means for changing the triggering levels of the gating device SCR from an initial lower level to a subsequent higher level. In the circuitry shown in FIG. 1, the detecting device 10 is energized through a closed circuit that includes switch 12 with blade 18 in engagement with terminal 2 and closed reset switch 24 in the energizing circuit to the B+ source.

In the improved system, the gating device SCR fires a second time when the rectifier ZD passes voltages of an amplitude corresponding to the upper threshold level shown in FIG. 2. The operation occurs at a time subsequent to the first firing operation of the SCR and in the provided circuitry turns off the operation of the detecting device 10 to indicate the occurrence with the relay K energized and the heretofore described anode circuit to the SCR open. A higher threshold level firing circuit for the gating device SCR includes a rectifier in the form of a diode $D_2$ that connects the energizing circuit and anode circuit for the SCR in bypassing relation to the detecting device 10. The circuit shown in FIG. 1 for this purpose includes a lead 71 to the lead 11, the diode $D_2$ and lead 72 to the anode circuit lead 21 of the gating device SCR. In the provided circuitry, the SCR fires at the upper voltage threshold level through the diode $D_2$. At any stage of operation of the system, the relay K can be reset by manually operating the reset switch 24 to open the energizing circuit to the coil 26.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In an electrical system for detecting a pulsating voltage input at a first amplitude threshold level and at a second amplitude threshold level higher than the first level, a relay having a coil, a make-break switch and a switch with a common terminal connected to a source of electrical energy through the relay coil, and second and third output terminals, an on-off circuit connected to the second output terminal of the three terminal switch including a gating device that fires initially at the first amplitude threshold level and fires subsequently at the second amplitude threshold level, a circuit connected to the third output terminal of the three terminal switch having a detecting device therein, an input circuit having an amplitude sensitive rectifier for passing pulsating inputs above the first threshold level, a circuit connecting the rectifier and gating device having parallel branches respectively including a resistor and the make-break relay switch in which the switch changes from a make condition shorting the resistor to a break condition at the first amplitude level with operation of the relay, and a higher threshold level firing circuit for the gating device having a rectifier therein connecting the detecting and on-off circuits in bypassing relation to the detecting device.

2. A system of the character claimed in claim 1, including a make-break reset switch, and a circuit including said reset switch between the electrical energy source and the common relay terminal.

3. A system of the character claimed in claim 2, including a rectifier connected across the relay coil in the circuit connecting the source to the common relay terminal.

4. A system of the character claimed in claim 3, in which the gating device is a silicon control rectifier and the rectifiers in the bypassing and reset switch circuits are diodes.

5. In an electrical system for detecting a pulsating voltage input at a first amplitude threshold level and a second amplitude threshold level higher than the first level, a relay having a coil, a make-break switch and a switch with a common terminal connected to a source of electrical energy through the relay coil, and second and third output terminals, an on-off circuit connected to the second output terminal of the three terminal switch including a silicon control rectifier that initially triggers at the first amplitude threshold level and subsequently triggers at the second amplitude threshold level, a circuit connected to the third output terminal of the three terminal switch having a detecting device therein, an input circuit having an amplitude sensitive rectifier for passing pulsating inputs above the first threshold level, means for changing the triggering level of the on-off circuit from the first threshold level to the second threshold level including a circuit between the amplitude sensitive rectifier and silicon control rectifier having the make-break relay switch therein in which the switch changes from a make condition to a break condition with operation of the relay, and a higher threshold level triggering circuit for the silicon control rectifier having a rectifier therein connecting the detecting and on-off circuits.

6. A system of the character claimed in claim 5, in which the amplitude sensitive rectifier is a zener diode, and the rectifier in the higher threshold triggering circuit is a diode.

7. A system of the character claimed in claim 6, including a circuit between the common terminal of the relay switch and the energy source including a make-break reset switch and a rectifier connected across the coil of the relay.

8. In an electrical system for monitoring the amplitude of an input voltage and for providing an indication when said amplitude remains within a predetermined upper threshold level after having exceeded a lower threshold level, comprising (a) an indicator device, (b) an input circuit responsive to said input voltage and having a first impedence value such that voltage inputs above said lower threshold level are passed thereby, (c) a gating device responsive to the voltage passed by said input circuit, (d) first switching means actuated by said gating device for energizing said indicator device, (e) second switching means responsive to actuation of said first switching means for increasing the impedence of said input circuit to a second, higher value such that voltage inputs above said upper threshold level are passed thereby whereby the triggering level of said gating device is raised to said upper threshold value, and (f) a further circuit responsive to said gating device for deenergizing said indicator device when said gating device is actuated at said upper triggering threshold level.

References Cited

UNITED STATES PATENTS

| | | | |
|---|---|---|---|
| 3,169,233 | 2/1965 | Schwartz | 328—151 X |
| 3,187,196 | 6/1965 | Corbell et al. | 307—88.5 |
| 3,219,839 | 11/1965 | Fletcher | 307—88.5 |
| 3,225,213 | 12/1965 | Hinrichs et al. | 328—135 X |

NEIL C. READ, *Primary Examiner.*

H. PITTS, *Assistant Examiner.*